(12) United States Patent
Brill et al.

(10) Patent No.: US 9,151,436 B2
(45) Date of Patent: Oct. 6, 2015

(54) LIQUID-CRYSTALLINE MIXTURES

(71) Applicant: BASF SE, Ludwigshafen (DE)

(72) Inventors: Jochen Brill, Speyer (DE); Ulrich Schalkowsky, Speyer (DE); Thomas Musiol, Maxdorf (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/088,912

(22) Filed: Nov. 25, 2013

(65) Prior Publication Data

US 2014/0117269 A1 May 1, 2014

Related U.S. Application Data

(63) Continuation of application No. 13/513,983, filed as application No. PCT/EP2010/069475 on Dec. 13, 2010, now abandoned.

(30) Foreign Application Priority Data

Dec. 17, 2009 (EP) ..................................... 09179739

(51) Int. Cl.
*F16L 59/02* (2006.01)
*C09K 19/20* (2006.01)
*C09K 19/32* (2006.01)
*G02B 1/04* (2006.01)
*C09K 19/04* (2006.01)

(52) U.S. Cl.
CPC ........... *F16L 59/028* (2013.01); *C09K 19/2007* (2013.01); *C09K 19/322* (2013.01); *G02B 1/04* (2013.01); *C09K 2019/0448* (2013.01); *C09K 2219/03* (2013.01)

(58) Field of Classification Search
CPC . F16L 59/028; C09K 19/322; C09K 19/2007; C09K 2019/0448; C09K 2219/03; G02B 1/04
USPC ........... 252/62, 582, 299.62, 299.63; 428/1.1; 349/182, 183; 427/58, 162, 256, 385.5
See application file for complete search history.

(56) References Cited

U.S. PATENT DOCUMENTS

| | | |
|---|---|---|
| 4,525,413 A | 6/1985 | Rogers et al. |
| 5,050,966 A | 9/1991 | Berman |
| 5,235,443 A | 8/1993 | Barnik et al. |
| 5,506,704 A | 4/1996 | Broer et al. |
| 5,691,789 A | 11/1997 | Li et al. |
| 5,793,456 A | 8/1998 | Broer et al. |
| 5,828,488 A | 10/1998 | Ouderkirk et al. |
| 5,948,831 A | 9/1999 | Broer et al. |
| 5,965,247 A | 10/1999 | Jonza et al. |
| 6,016,177 A | 1/2000 | Motomura et al. |
| 6,061,108 A | 5/2000 | Anderson et al. |
| 6,099,758 A | 8/2000 | Verrall et al. |
| 6,136,225 A | 10/2000 | Meyer et al. |
| 6,417,902 B1 | 7/2002 | Greenfield et al. |
| 6,421,107 B1 | 7/2002 | Greenfield et al. |
| 6,733,689 B1 | 5/2004 | Meyer et al. |
| 7,670,505 B2 | 3/2010 | Enger et al. |
| 2003/0219548 A1 | 11/2003 | Meyer et al. |
| 2008/0221289 A1 | 9/2008 | Enger et al. |
| 2010/0032621 A1 | 2/2010 | Itano et al. |
| 2010/0090163 A1 | 4/2010 | Irisawa et al. |
| 2010/0294990 A1 | 11/2010 | Hamada et al. |
| 2011/0092718 A1 | 4/2011 | Enger et al. |
| 2011/0097562 A1 | 4/2011 | Brill et al. |

FOREIGN PATENT DOCUMENTS

| | | |
|---|---|---|
| DE | 198 43 724 | 4/1999 |
| DE | 199 05 394 | 8/2000 |
| EP | 0 747 382 | 12/1996 |
| EP | 0 750 029 | 12/1996 |
| EP | 0 931 110 | 7/1999 |
| EP | 1 136 478 | 9/2001 |
| EP | 2 067 796 | 6/2009 |
| EP | 2 110 390 | 10/2009 |
| EP | 2 130 843 | 12/2009 |
| WO | 96 02597 | 2/1996 |
| WO | 97 00600 | 1/1997 |
| WO | 97 27251 | 7/1997 |
| WO | 97 27252 | 7/1997 |
| WO | 98 47979 | 10/1998 |
| WO | 99 11733 | 3/1999 |
| WO | 99 19267 | 4/1999 |
| WO | 00 37585 | 6/2000 |
| WO | 2006 120220 | 11/2006 |
| WO | 2009 153287 | 12/2009 |

OTHER PUBLICATIONS

International Search Report Issued Mar. 14, 2011 in PCT/EP10/69475 Filed Dec. 13, 2010.

*Primary Examiner* — Geraldina Visconti

(74) *Attorney, Agent, or Firm* — Oblon, McClelland, Maier & Neustadt, L.L.P.

(57) ABSTRACT

The present invention describes liquid-crystalline mixtures, and also oligomers or polymers which are obtainable by oligomerizing or polymerizing the inventive liquid-crystalline mixtures, a process for printing or coating substrates by applying and then polymerizing the inventive liquid-crystalline mixtures and the use of the inventive liquid-crystalline mixtures or of the inventive oligomers or polymers for production of optical or electrooptical components.

The present invention further relates to the use of the inventive liquid-crystalline mixtures which comprise at least one chiral dopant for production of thermal insulation layers, and to such thermal insulation layers.

17 Claims, 3 Drawing Sheets

Figure 1 (no cracks)
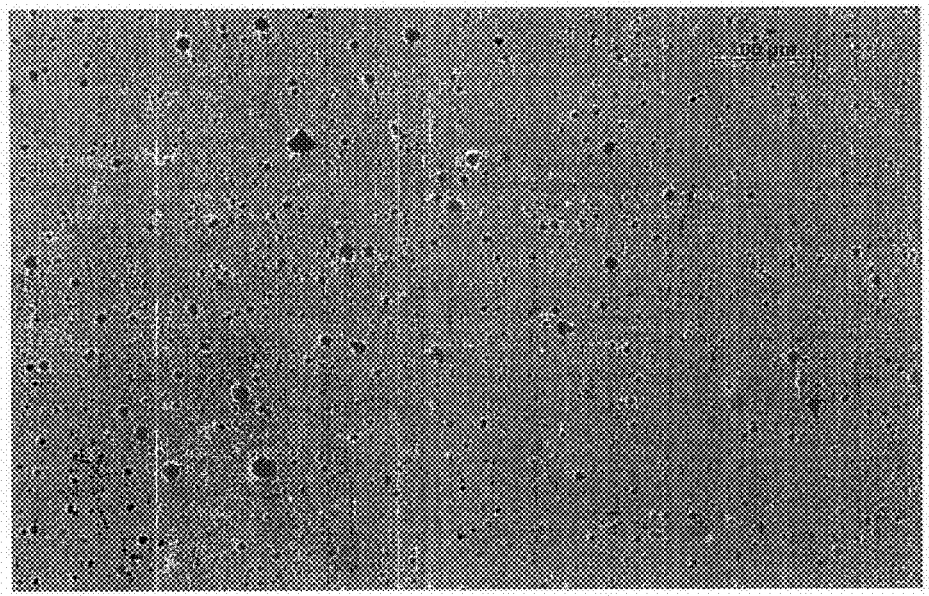
Figure 2 (individual, short cracks)
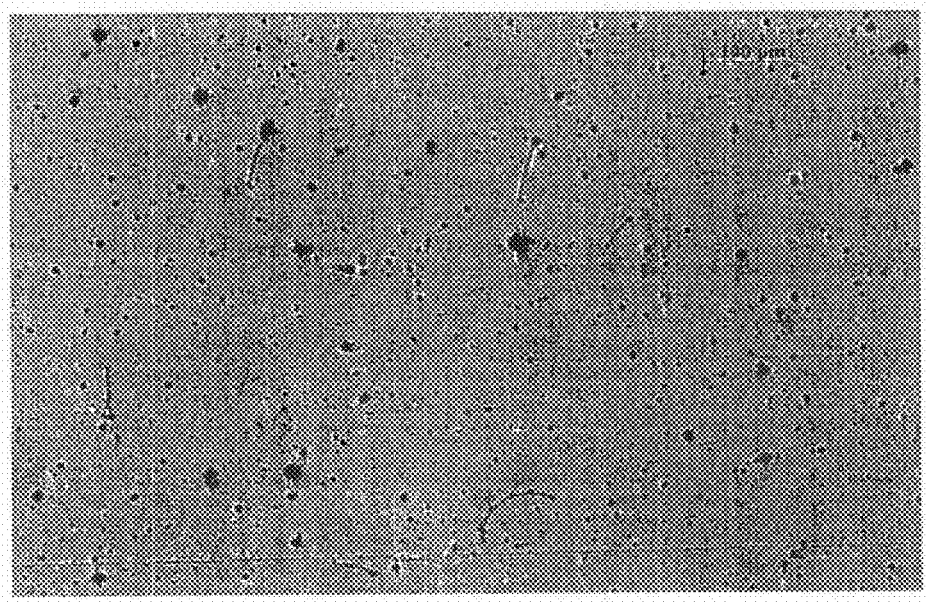

Figure 3 (long cracks, some joined)
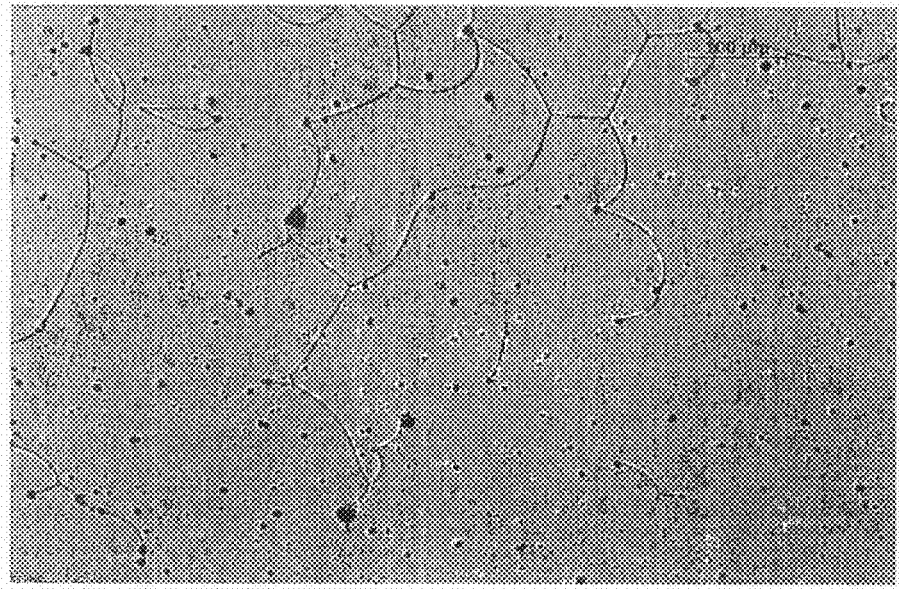
Figure 4 (large domains, some open)
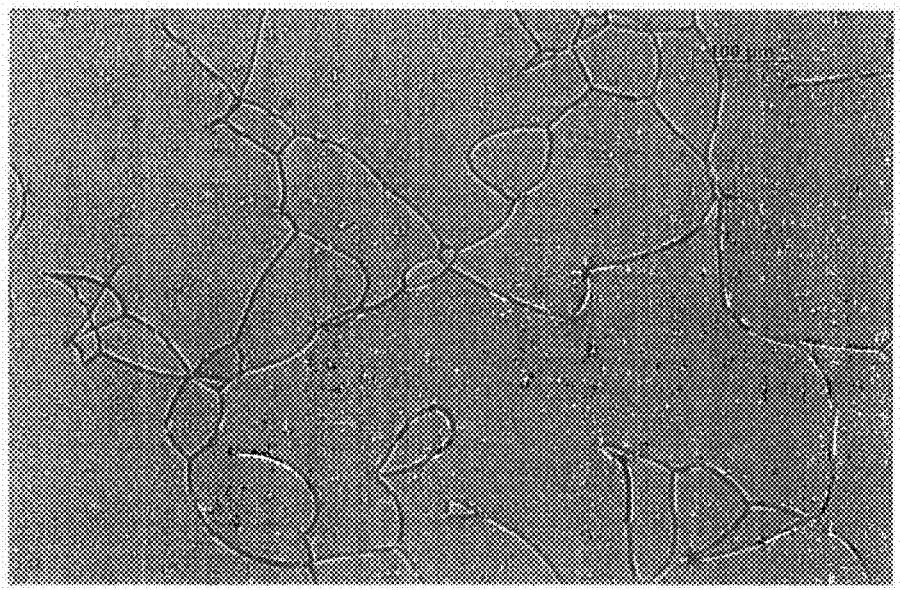

Figure 5 (closed domains)
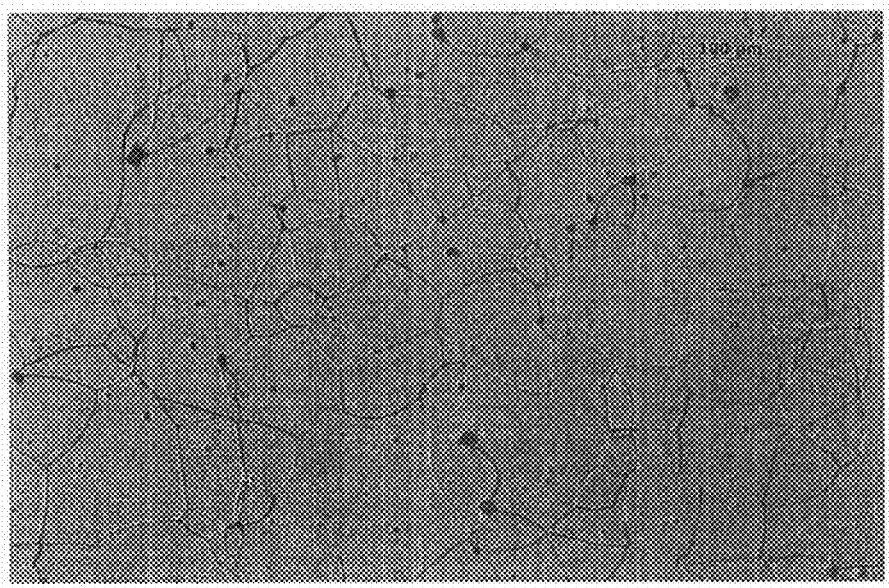
Mark 6 (small domains)
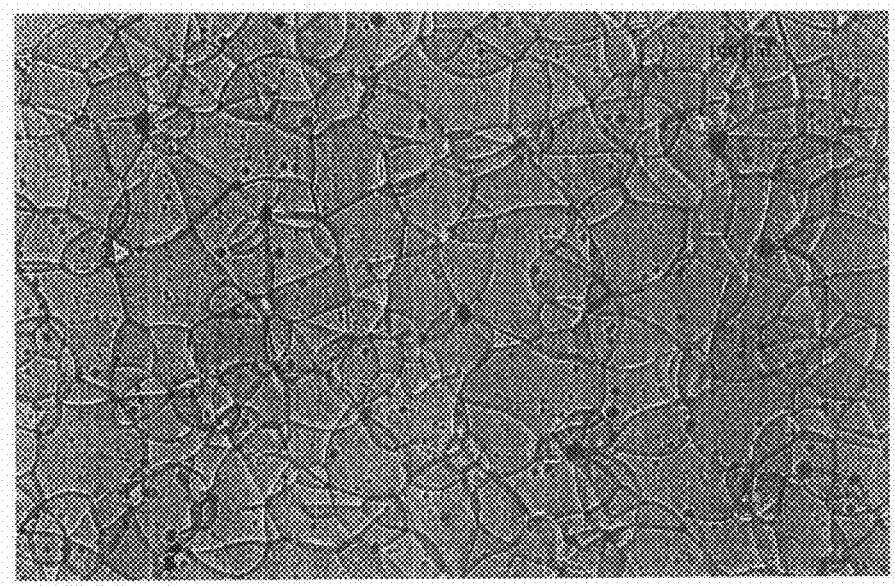

LIQUID-CRYSTALLINE MIXTURES

CROSS-REFERENCE TO RELATED APPLICATIONS

This application is a continuation of U.S. application Ser. No. 13/513,983, filed Jun. 5, 2012, which is the National Stage of International Application No. PCT/EP2010/069475, filed Dec. 13, 2010, which claimed priority to European Application no. 09179739.9, filed Dec. 17, 2019; of which all of the disclosures are incorporated herein by reference in their entireties.

DESCRIPTION

The present invention describes liquid-crystalline mixtures, and also oligomers or polymers which are obtainable by oligomerizing or polymerizing the inventive liquid-crystalline mixtures, a process for printing or coating substrates by applying and then polymerizing the inventive liquid-crystalline mixtures and the use of the inventive liquid-crystalline mixtures or of the inventive oligomers or polymers for production of optical or electrooptical components.

The present invention further relates to the use of the inventive liquid-crystalline mixtures which comprise at least one chiral dopant for production of thermal insulation layers, and to such thermal insulation layers.

When heated, numerous compounds are not converted from the crystalline state with defined short-range and long-range order of the molecules directly to the liquid, unordered state, but rather pass through a liquid-crystalline phase in which the molecules are mobile but the molecule axes form an ordered structure. Elongated molecules often form nematic liquid-crystalline phases which are characterized by long-range orientation through parallel alignment of the longitudinal axes of the molecules. When such a nematic phase comprises chiral compounds or chiral molecular moieties, a chiral nematic or cholesteric phase can form, which is characterized by a helical superstructure. The lesser or greater the proportion of chiral compound or chiral molecular moiety in a given system, the greater or lesser is the pitch of the helical superstructure. In order that electromagnetic radiation of comparatively long wavelength, for example in the region of NIR radiation, can be reflected to a sufficient degree, the formation of maximum layer thicknesses of the chiral-nematic phase is required, which, however, is typically associated with an increase in the misorientation of the helical superstructure.

In addition, it is important for the application of the liquid-crystalline materials that the liquid-crystalline phase is within the required temperature range and has sufficient phase width.

It was therefore an object of the present invention to provide liquid-crystalline materials with comparatively high birefringent properties, which are present in the liquid-crystalline phase under the conditions of the application, have a sufficiently high phase width and additionally permit the production of low-defect layers even at relatively high layer thicknesses.

Accordingly, liquid-crystalline mixtures have been found, which comprise
as component A:
one or more compounds of the general formula I

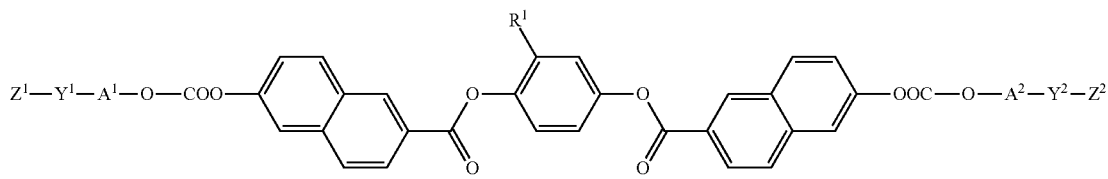

in which the variables are defined as follows:
$Z^1$, $Z^2$ are each independently

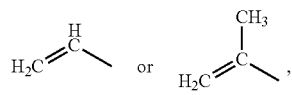

$A^1$, $A^2$ are each independently spacers having 4 to 8 carbon atoms,
$Y^1$, $Y^2$ are each independently a chemical single bond, oxygen, —CO—, —O—CO— or —CO—O—,
$R^1$ is hydrogen, $C_1$-$C_6$-alkyl or CO—O—O—$C_1$-$C_6$-alkyl,
as component B:
one or more compounds of the general formula II

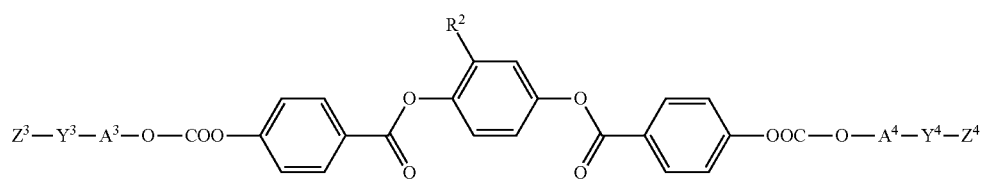

in which the variables are defined as follows:
$Z^3$, $Z^4$ are each independently

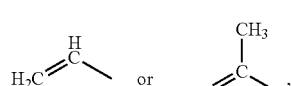

$A^3$, $A^4$ are each independently spacers having 4 to 8 carbon atoms, $Y^3$, $Y^4$ are each independently a chemical single bond, oxygen, —CO—, —O—CO— or —CO—O—, $R^2$ is hydrogen, $C_1$-$C_6$-alkyl or CO—O—$C_1$-$C_6$-alkyl, where the proportion of component A is 22.5 mol % to 32.5 mol % and the proportion of component B is 67.5 mol % to 77.5 mol %, based on the total molar amount of A and B, and the proportions of components A and B add up to 100 mol %, and as component C:

one or more substances selected from the group consisting of:

C.1 photoinitiators;

C.2 reactive diluents which comprise photopolymerizable groups;

C.3 solvents;

C.4 defoamers and deaerators;

C.5 lubricants and leveling agents;

C.6 thermally curing and/or radiatively curing auxiliaries;

C.7 substrate wetting aids;

C.8 wetting and dispersing aids;

C.9 hydrophobizing agents;

C.10 adhesion promoters;

C.11 auxiliaries for improving scratch resistance; and

C.12 chiral dopants, and optionally as component D:

one or more substances selected from the group consisting of:

D.1 dyes; and

D.2 pigments.

Preferably, the $Z^1$ and $Z^2$ radicals in formula I and the $Z^3$ and $Z^4$ radicals in formula II are the same. More particularly, all $Z^1$ to $Z^4$ radicals are vinyl groups.

Preference is given to liquid-crystalline mixtures in which $Z^1$—$Y^1$ and $Y^2$—$Z^2$ in formula I of component A and $Z^3$—$Y^3$ and $Y^4$—$Z^4$ in formula II of component B are reactive moieties

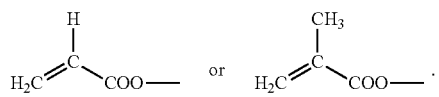

More particularly, the $Z^1$—$Y^1$ and $Y^2$—$Z^2$ and $Z^3$—$Y^3$ and $Y^4$—$Z^4$ moieties are each the same as one another. More preferably, all $Z^1$—$Y^1$, $Y^2$—$Z^2$, $Z^3$—$Y^3$ and $Y^4$—$Z^4$ moieties are acryloyloxy groups.

The spacers $A^1$ and $A^2$ comprise 4 to 8 carbon atoms and consist of predominantly linear aliphatic groups. They may be interrupted in the chain by nonadjacent oxygen atoms. Possible substituents for the spacer chain include, for example, fluorine, chlorine, bromine, cyano, methyl and ethyl.

The spacers $A^1$ and $A^2$, and $A^3$ and $A^4$, are preferably each the same as one another.

Representative unsubstituted spacers $A^1$, $A^2$, $A^3$ and $A^4$ are, for example:

representative substituted spacers $A^1$, $A^2$, $A^3$ and $A^4$ are, for example:

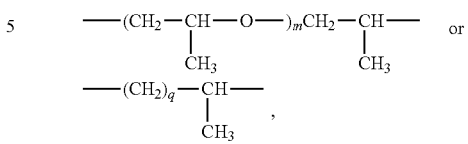

where p represents integers of 4 to 8, m represents integers of 1 to 3, and q represents integers of 3 to 7.

$C_1$-$C_6$-Alkyl in the definition of the $R^1$ and $R^2$ radicals or in the CO—O—$C_1$-$C_6$-alkyl moieties in the definition of the $R^1$ and $R^2$ radicals in the formulae I and II are understood to mean methyl, ethyl, propyl, isopropyl, butyl, isobutyl, sec-butyl, tert-butyl, pentyl, isopentyl, neopentyl, tert-pentyl, hexyl and 2-methylpentyl. The $C_3$-$C_6$-alkyl radicals are preferably unbranched. Preferred radicals are methyl, ethyl, propyl, butyl, pentyl and hexyl.

BRIEF DESCRIPTION OF DRAWINGS

FIGS. 1-6 show the films obtained in the Examples below. The films were assessed qualitatively under an optical microscope with a magnification of 100:1. Comparisons were made against images of films of different quality (FIGS. 1 to 6); the marks given ranged from 1 (best—FIG. 1) to 6 (worst—FIG. 6).

The preparation of the compounds of the general formula I of component A is described, for example, in the publication WO 97/00600 A2; the preparation of the compounds of the general formula II of component B is described, for example, in the publication WO 2006/120220 A1.

When the inventive liquid-crystalline mixtures are to be photochemically polymerized, commercial photoinitiators are typically added thereto as component C.1. For curing by electron beams, such photoinitiators, however, are generally unnecessary.

Suitable photoinitiators C.1 are, for example, isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]-phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bis(dimethylamine)benzophenone, ($\eta^5$-cyclopentadienyl) ($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

These photoinitiators C.1 are commercially available under the brand names Lucirin®, Irgacure® and Darocure®. Preference is given to using the initiators Lucirin® TPO, Lucirin® TPO-L, Irgacure® Oxe 01, Irgacure® Oxe 02, Irgacure® 1300, Irgacure® 184, Irgacure® 369, Irgacure® 907 or Darocure® 1173, and particular preference to using the initiators Lucirin® TPO, Lucirin® TPO-L, Irgacure® Oxe 01, Irgacure® Oxe 02, Irgacure® 1300 or Irgacure® 907.

The photoinitiators are used typically in a proportion of about 0.1 to 5.0% by weight based on the total weight of the inventive liquid-crystalline mixtures. Specifically when the hardening is performed under inert gas atmosphere, it is possible to use significantly smaller amounts of photoinitiators. In this case, the photoinitiators are used in a proportion of about 0.1 to 1.0% by weight, preferably 0.2 to 0.6% by weight, based on the total weight of the inventive liquid-crystalline mixtures.

The reactive diluents C.2 which are typically capable of photopolymerization include, for example, mono-, bi- or polyfunctional compounds having at least one olefinic double bond. Examples thereof are vinyl esters of carboxylic acids, for example of lauric acid, myristic acid, palmitic acid or stearic acid, or of dicarboxylic acids, for example of succinic acid and adipic acid, allyl or vinyl ethers or methacrylic or acrylic esters of monofunctional alcohols, for example of lauryl alcohol, myristyl alcohol, palmityl alcohol or stearyl alcohol, or diallyl or divinyl ethers of bifunctional alcohols, for example of ethylene glycol and of butane-1,4-diol.

Further useful examples are methacrylic or acrylic esters of polyfunctional alcohols, especially of those which alongside the hydroxyl groups comprise no further functional groups or, at most, ether groups. Examples of such alcohols are, for example, bifunctional alcohols such as ethylene glycol, propylene glycol, and their more highly condensed representatives, for example diethylene glycol, triethylene glycol, dipropylene glycol, tripropylene glycol, etc., butanediol, pentanediol, hexanediol, neopentyl glycol, alkoxylated phenolic compounds such as ethoxylated or propoxylated bisphenols, cyclohexanedimethanol, trifunctional and higher-functionality alcohols such as glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols.

Further useful reactive diluents C.2 include polyester (meth)acrylates, which are the (meth)acrylic esters of polyesterols.

Useful polyesterols include, for example, those which can be prepared by esterifying polycarboxylic acids, preferably dicarboxylic acids, with polyols, preferably diols. The starting materials for such hydroxyl-containing polyesters are known to those skilled in the art. The dicarboxylic acids used may be succinic acid, glutaric acid, adipic acid, sebacic acid, o-phthalic acid, and their isomers and hydrogenation products, and also esterifiable or transesterifiable derivatives of the acids mentioned, for example anhydrides or dialkyl esters. Useful polyols include the abovementioned alcohols, preferably ethylene glycol, 1,2- and 1,3-propylene glycol, 1,4-butanediol, 1,6-hexanediol, neopentyl glycol, cyclohexanedimethanol and polyglycols of the ethylene glycol and propylene glycol type.

Also useful as reactive diluents of group C.2 are 1,4-divinylbenzene, triallyl cyanurate, acrylic esters of tricyclodecenyl alcohol of the following formula

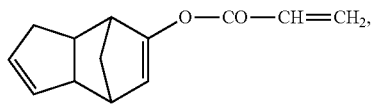

also known by the name dihydrodicyclopentadienyl acrylate, and the allyl esters of acrylic acid, of methacrylic acid and of cyanoacrylic acid.

When reactive diluents are used, the amount and properties thereof have to be adjusted to the particular conditions in such a way that, on the one hand, a satisfactory desired effect, for example the desired reflected wavelength of the inventive liquid-crystalline mixtures, is achieved, but, on the other hand, the phase behavior of the liquid-crystalline mixture is not too greatly impaired. For the preparation of low-crosslinking (high-crosslinking) liquid-crystalline mixtures, it is possible, for example, to use appropriate reactive diluents which have a relatively low (high) number of reactive units per molecule.

The reactive diluents are typically used in a proportion of about 0.5 to 20.0% by weight, based on the total weight of the inventive liquid-crystalline mixtures.

Solvents C.3 include, for example, $C_1$-$C_4$-alcohols, for example methanol, ethanol, n-propanol, isopropanol, butanol, isobutanol, sec-butanol, tert-butanol, and the $C_5$-$C_{12}$-alcohols n-pentanol, n-hexanol, n-heptanol, n-octanol, n-nonanol, n-decanol, n-undecanol and n-dodecanol and isomers thereof, glycols, for example 1,2-ethylene glycol, 1,2- or 1,3-propylene glycol, 1,2-, 2,3- or 1,4-butylene glycol, di- or triethylene glycol or di- or tripropylene glycol, ethers, for example open-chain ethers such as methyl tert-butyl ether, 1,2-ethylene glycol monomethyl or dimethyl ether, 1,2-ethylene glycol monoethyl or diethyl ether, 3-methoxypropanol or 3-isopropoxypropanol, or cyclic ethers such as tetrahydrofuran or dioxane, open-chain ketones, for example acetone, methyl ethyl ketone, methyl isobutyl ketone or diacetone alcohol (4-hydroxy-4-methyl-2-pentanone), cyclic ketones such as cyclopentanone or cyclohexanone, $C_1$-$C_5$-alkyl esters, for example methyl acetate, ethyl acetate, propyl acetate, butyl acetate or amyl acetate, $C_1$-$C_4$-alkoxy-$C_1$-$C_4$-alkyl esters such as 1-methoxyprop-2-yl acetate, carboxamides such as dimethylformamide and dimethylacetamide, N-heterocycles such as N-methylpyrrolidone, aliphatic or aromatic hydrocarbons, for example pentane, hexane, heptane, octane, isooctane, petroleum ether, toluene, xylene, ethylbenzene, tetralin, decalin, dimethylnaphthalene, white spirit, Shellsol® or Solvesso®. As a matter of course, mixtures of these solvents are also useful for use in the inventive mixtures.

Particularly suitable diluents in the inventive liquid-crystalline mixtures are linear or branched esters, particularly acetic esters, $C_1$-$C_4$-alkoxy-$C_1$-$C_4$-alkyl esters such as 1-methoxyprop-2-yl acetate, cyclic esters, carboxamides such as dimethylformamide and dimethylacetamide, open-chain and cyclic ethers, alcohols, lactones, open-chain and cyclic ketones such as cyclopentanone and cyclohexanone, and aliphatic and aromatic hydrocarbons such as toluene, xylene and cyclohexane.

The solvents are used typically in a proportion of about 50 to 95% by weight, preferably of about 65 to 80% by weight, based on the total weight of the inventive liquid-crystalline mixtures. According to the intended application, the proportion may, however, be higher or lower than the limits specified.

The effects of the defoamers and deaerators C.4, lubricants and leveling agents C.5, thermally curing or radiatively curing auxiliaries C.6, substrate wetting aids C.7, wetting and dispersing aids C.8, hydrophobizing agents C.9, adhesion promoters C.10 and auxiliaries for improving scratch resistance C.11 listed under component C usually cannot be strictly delimited from one another. For instance, lubricants and leveling agents often additionally act as defoamers and/or deaerators and/or as auxiliaries for improving scratch resistance. Radiatively curing auxiliaries can in turn act as lubricants and leveling agents and/or deaerators and/or also as substrate wetting aids. In the individual case, some of these auxiliaries may also perform the function of an adhesion promoter C.11. In accordance with the above statements, a certain additive may therefore be attributed to more than one of the groups C.4 to C.11 described below.

The defoamers of group C.4 include silicon-free and silicon-containing polymers. The silicon-containing polymers are, for example, unmodified or modified polydialkylsiloxanes or branched copolymers, comb copolymers or block copolymers composed of polydialkylsiloxane and polyether units, the latter being obtainable from ethylene oxide or propylene oxide.

The deaerators of group C.4 include, for example, organic polymers, for instance polyethers and polyacrylates, dialkylpolysiloxanes, especially dimethylpolysiloxanes, organically modified polysiloxanes, for instance arylalkyl-modified polysiloxanes, or else fluorosilicones. The action of defoamers is based essentially on preventing foam formation or destroying foam which has already formed. Deaerators act essentially by promoting coalescence of finely distributed gas or air bubbles to larger bubbles in the medium to be deaerated, for example the inventive mixtures, and hence accelerate the escape of the gas (or of the air). Since defoamers can often also be used as deaerators and vice versa, these additives have been combined together under group C.4.

Such auxiliaries are, for example, obtainable commercially from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 960, Tego® Airex 970, Tego® Airex 980 and Tego® Airex 985, and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-067, BYK®-070, BYK®-080, BYK®-088, BYK®-141 and BYK®-A 530.

The auxiliaries of group C.4 are typically used in a proportion of about 0.05 to 5.0% by weight, based on the total weight of the inventive liquid-crystalline mixtures.

The group C.5 of the lubricants and leveling agents typically includes, for example, silicon-free but also silicon-containing polymers, for example polyacrylates or modified low molecular weight polydialkylsiloxanes. The modification consists in replacing some of the alkyl groups with a wide variety of organic radicals. These organic radicals are, for example, polyethers, polyesters or else long-chain alkyl radicals, the former finding most frequent use.

The polyether radicals of the correspondingly modified polysiloxanes are typically formed by means of ethylene oxide and/or propylene oxide units. The higher the proportion of these alkylene oxide units is in the modified polysiloxane, the more hydrophilic is generally the resulting product.

Such auxiliaries are obtainable commercially, for example, from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (also usable as a defoamer and deaerator), TEGO® Flow ATF, TEGO® Flow ATF2, TEGO® Flow 300, TEGO® Flow 460, TEGO® Flow 425 and TEGO® Flow ZFS 460. The radiation-curable lubricants and leveling agents used, which additionally also serve to improve scratch resistance, can be the products TEGO® Rad 2100, TEGO® Rad 2200, TECO® Rad 2300, TEGO® Rad 2500, TEGO® Rad 2600, TEGO® Rad 2700 and TEGO® Twin 4000, likewise obtainable from Tego. Examples of such auxiliaries obtainable from BYK are BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

The auxiliaries of group C.5 are typically used in a proportion of about 0.01 to 5.0% by weight, based on the total weight of the inventive liquid-crystalline mixtures.

Group C.6 includes, as radiatively curing auxiliaries, in particular polysiloxanes with terminal double bonds which are, for example, part of an acrylate group. Such auxiliaries can be made to crosslink by actinic or, for example, electron beam radiation.

These auxiliaries generally combine several properties in one. In the uncrosslinked state, they can act as defoamers, deaerators, lubricants and leveling agents and/or substrate wetting aids; in the crosslinked state, they increase in particular the scratch resistance, for example of coatings or films which can be produced with the inventive mixtures. The improvement in the gloss performance of, for example, coatings or films can essentially be regarded as the effect of the action of these auxiliaries as defoamers, deaerators and/or lubricants and leveling agents (in the uncrosslinked state). Radiation-curing auxiliaries which can be used are, for example, the products TEGO® Rad 2100, TEGO® Rad 2200, TEGO® Rad 2500, TEGO® Rad 2600 and TEGO® Rad 2700 obtainable from Tego, and the product BYK®-371 obtainable from BYK.

The auxiliaries of group C.6 are typically used in a proportion of about 0.01 to 5.0% by weight, based on the total weight of the inventive liquid-crystalline mixtures.

The auxiliaries of group C.7 of the substrate wetting aids serve in particular to increase the wettability of the substrates which are to be printed or coated with the inventive liquid-crystalline mixtures. There is generally an associated improvement in the lubricating and leveling performance of inventive liquid-crystalline mixtures, and this has an effect on the appearance of the finished (for example crosslinked) print or of the finished (for example crosslinked) layer. A wide variety of such auxiliaries are commercially available, for example, from Tego as TEGO® Wet KL 245, TEGO® Wet 250, TEGO® Wet 260 and TEGO® Wet ZFS 453, and from BYK as BYK®-306, BYK®-307, BYK®-310, BYK®-333, BYK®-344, BYK®-345, BYK®-346 and Byk®-348.

Also very suitable are the products of the Zonyl® brand from Dupont, such as Zonyl® FSA and Zonyl® FSG. These are fluorinated surfactants/wetting agents.

The auxiliaries of group C.7 are typically used in a proportion of about 0.01 to 5.0% by weight, based on the total weight of the inventive liquid-crystalline mixtures.

The auxiliaries of group C.8 of the wetting and dispersing aids serve in particular to prevent the flotation and also the settling of pigments, and are therefore useful, if necessary, in pigmented inventive liquid-crystalline mixtures in particular.

These auxiliaries stabilize pigment dispersions essentially by electrostatic repulsion and/or steric hindrance of the additized pigment particles, the interaction of the auxiliary with the surrounding medium (for example binder) playing a major role in the latter case. Since the use of such wetting and dispersing aids is common practice, for example, in the technical field of printing inks and paints, the selection of such a suitable auxiliary in any given case generally presents no difficulties to the person skilled in the art.

Such wetting and dispersing aids are supplied commercially, for example, by Tego as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W, and by BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra® 5 206, BYK®-151, BYK®-154, BYK®-155, BYK®-P 104 S, BYK®-P 105, Lactimon®, Lactimon®-WS and Bykumen®. The above-mentioned Zonyl® brands, such as Zonyl® FSA and Zonyl® FSG, from DuPont are also useful here.

The dosage of the auxiliaries of group C.8 depends mainly upon the surface area to be covered on the pigments and upon the mean molar mass of the auxiliary.

For inorganic pigments and low molecular weight auxiliaries, a content of the latter of about 0.5 to 2.0% by weight based on the total weight of pigment and auxiliary is typically assumed. In the case of high molecular weight auxiliaries, the content is increased to about 1.0 to 30% by weight.

In the case of organic pigments and low molecular weight auxiliaries, the content of the latter is about 1.0 to 5.0% by weight based on the total weight of pigment and auxiliary. In the case of high molecular weight auxiliaries, this content may be in the range about 10.0 to 90% by weight. In every case, therefore, preliminary experiments are recommended, but these are easily accomplished by the person skilled in the art.

The hydrophobizing agents of group C.9 can be used with a view, for example, to providing prints or coatings with water-repellent properties by using inventive liquid-crystalline mixtures. This means that swelling resulting from water absorption and resultant change, for example, in the optical properties of such prints or coatings is no longer possible or at least greatly suppressed. In addition, when the mixtures are used, for example, as a printing ink in offset printing, their absorption of water can be prevented or at least greatly inhibited.

Such hydrophobizing agents are commercially available, for example, from Tego as Tego® Phobe WF, Tego® Phobe 1000, Tego® Phobe 1000 S, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries of group C.9 are used typically in a proportion of about 0.05 to 5.0% by weight, based on the total weight of the inventive liquid-crystalline mixtures.

Adhesion promoters of group C.10 serve to improve the adhesion between two interfaces in contact. It immediately becomes evident from this that essentially only the proportion of the adhesion promoter which is present in one interface, the other interface or in both interfaces is effective. When the intention is to apply, for example, liquid or pasty printing inks, coatings or paints to a solid substrate, this generally means that either the adhesion promoter has to be added directly to the latter or the substrate has to be subjected to a pretreatment with the adhesion promoters (also known as priming), i.e. that changed chemical and/or physical surface properties are imparted to this substrate.

To the extent that the substrate has been primed beforehand with a undercoat, this means that the interfaces in contact are now that of the undercoat on the one hand and that of the inventive liquid-crystalline mixtures on the other hand. Thus, in this case, not only the adhesion properties between substrate and undercoat, but also between undercoat and the inventive liquid-crystalline mixtures, are of significance for the adhesion of the entire combination on the substrate. It is also possible for the substrate wetting aids already detailed under group C.7 to be addressed as adhesion promoters in the wider sense, but these generally do not have the same capacity for adhesion promotion.

In view of the wide variety of physical and chemical properties of substrates and of inventive liquid-crystalline mixtures envisaged, for example, for the printing or coating thereof, the multitude of adhesion promoter systems is not surprising. Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane or vinyltrimethoxysilane. These and further silanes are obtainable, for example, under the brand name DYNASILAN® from Hülls.

Adhesion promoters based on titanates/zirconates and on titanium/zirconium bisacetylacetonates correspond, for example, to the following formulae

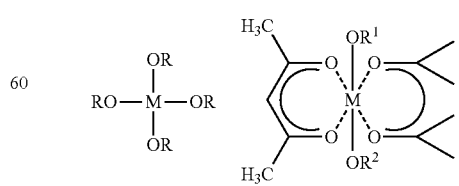

in which M is titanium or zirconium, and R, $R^1$ and $R^2$ are each $C_1$-$C_4$-alkyl, for example isopropyl or n-butyl.

Examples of such compounds are, for instance, tetraisopropyl titanate, tetra-n-butyl titanate, titanium bis(acetylacetonate) diisopropoxide, titanium bis(acetylacetonate)dibutoxide, titanium bis(acetylacetonate)monobutoxide monoisopropoxide or titanium bis(acetylacetonate)monoethoxide monoisopropoxide.

Further titanium and zirconium compounds usable as adhesion promoters are n-butyl polytitanate, isopropyl triisostearoyltitanate, isopropyl tris(N-ethylaminoethylamino)-titanate and zirconium bis(diethylcitrate)diisopropoxide. These and further titanium and zirconium compounds are obtainable, for example, under the brand names TYZOR® (from DuPont), Ken-React® (from Kenrich Petrochemicals Inc.) and Tilcom® (from Tioxide Chemicals). Adhesion promoters used may also be zirconium aluminates, as obtainable, for example under the brand name Manchem® (from Rhône Poulenc). Further examples of useful adhesion-promoting additives in printing inks or paints are chlorinated polyolefins (obtainable, for example, from Eastman Chemical and Toyo Kasei), polyesters (obtainable, for example, from Hülls AG, BASF SE, Gebr. Borchers AG, Pluess-Staufer AG, Hoechst AG and Worlee), compounds based on sucrose, for example sucrose benzoate or sucrose acetoisobutyrate (the latter obtainable, for example, from Eastman Chemical), phosphoric esters (obtainable, for example, from The Lubrizol Company and Hoechst AG) and polyethyleneimines (obtainable, for example, from BASF SE), and examples of useful adhesion-promoting additives in printing inks for flexographic printing, film printing and packaging printing are rosin esters (obtainable, for example, from Robert Kraemer GmbH).

Typically, the substrate to be printed or to be coated will be pretreated appropriately, i.e. such additives will be used as primers. Appropriate technical information for this purpose can generally be learnt from the manufacturers of such additives, or the person skilled in the art can obtain this information in a simple manner by appropriate preliminary experiments.

If these additives, however, are to be added as auxiliaries of group C.10 to the inventive liquid-crystalline mixtures, the content thereof is typically about 0.05 to 5.0% by weight based on the total weight of the inventive liquid-crystalline mixtures. These concentration data serve merely as an indication, since the amount and identity of the additive are determined in any individual case by the nature of the substrate and of the printing/coating composition. Typically, appropriate technical information here is available from the manufacturers of such additives, or can be determined by the person skilled in the art by appropriate preliminary experiments in a simple manner.

The group C.11 of the auxiliaries for improving scratch resistance includes, for example, the products TEGO® Rad 2100, TEGO® Rad 2200, TEGO® Rad 2500, TEGO® Rad 2600 and TEGO® Rad 2700 which are obtainable from Tego and have already been mentioned above.

These additives are typically used in a proportion of about 0.1 to 5.0% by weight, based on the total weight of the inventive liquid-crystalline mixtures.

Preferred chiral dopants C.12 correspond to the general formulae $(P—Y—)_pX$, $(P—Y-A-Y—)_pX$ and $(P—Y-A-Y-M-Y—)_p—X$, in which the variables P represent reactive or unreactive radicals, Y represents linking units, for example single chemical bonds, oxygen atoms, CO, COO or O—COO, and A represents spacers, M denotes mesogenic groups, p represents values of 1, 2, 3, 4, 5 or 6 and X represents appropriate p-valent chiral radicals, where the p moieties bonded to the chiral X radical may be the same or different.

Possible X radicals are, for example, shown on pages 5 to 9 of the document WO 95/16007 A1, and particular mention should be made of the divalent radicals

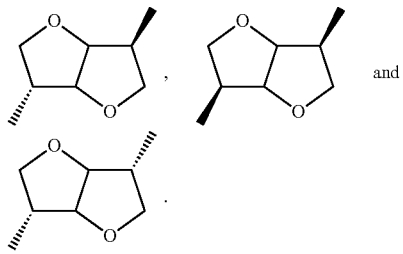

Further chiral dopants which comprise the chiral X radicals mentioned or other suitable chiral X radicals are specified, for example, in the documents EP 0 747 382 A1, EP 0 750 029 A1, EP 1 136 478 A1 and DE 198 43 724 A1.

The present invention further provides oligomers or polymers which are obtainable by oligomerizing or polymerizing inventive liquid-crystalline mixtures. These inventive oligomers or polymers may especially also be present in the form of films, i.e. self-supporting layers of uniform thickness. These films may be present on substrates, the properties of which are such that suitable measures enable easy detachment and permanent transfer to other substrates. Such films are usable, for example, in the film coating sector and in lamination processes.

Furthermore, such films, whose properties have been adapted to the particular end use, can be used in a wide variety of different fields. For example, they may find use in devices for displaying visual information. Such devices are, for instance, video or overhead projectors, electrophoretic display devices, traffic displays, LCDs for use in computer monitors, or in televisions, or in visual display units in printers or kitchen appliances, and also advertising panels, illumination systems and information panels, and additionally mobile visual display units, for example visual display units in cellphones, laptops, digital cameras, vehicles and destination displays on buses and trains. They may be present in these devices in a wide variety of functions, for example as color filters or films for the generation of wavelength-selective or broadband-polarized light.

The present invention further provides a process for printing or coating substrates, which comprises applying inventive liquid-crystalline mixtures to the substrate and then polymerizing them.

With regard to the procedure for printing or coating substrates with liquid-crystalline materials, reference is made mutatis mutandis to the document WO 96/02597 A2. Furthermore, a polymerized layer which has been produced with the aid of the process according to the invention and partly or fully covers the original substrate surface should also be considered as a substrate in the context of the application, and so the production of multiply printed and/or coated substrates is also encompassed by the invention.

It should further be noted here that "printing" is typically understood to mean the incomplete coverage of the substrate surface, and "coating" to mean the full coverage of the substrate surface.

Useful substrates in addition to paper and card products, for example for carrier bags, magazines, brochures, gift packaging and packaging materials for consumer goods, consumable goods and luxury goods, are additionally also films, for instance for decorative and nondecorative packaging purposes, and also textiles of any type and leather. In addition, useful substrates are also those materials used to produce banknotes, securities, entrance tickets, and the like.

Further substrates are also goods for (entertainment) electronics, for example music cassettes (MCs), SVHS and VHS cassettes, minidisks (MDs), compact disks (CDs), digital versatile disks (DVDs), Blu-ray disks (BDs) and the corresponding reproduction and/or recording units, televisions, radios, telephones/cellphones, computers, etc, and goods from the leisure, sports, domestic and games sector, for instance bicycles, children's vehicles, skis, snowboards and surfboards, inline skates, roller skates and ice skates and also domestic appliances. In addition, such substrates should also be understood to mean, for example, writing utensils and spectacle frames.

Further substrates are also a very wide variety of films which find use in optical or electrooptical components or in their production. Such films consist, for example, of polyvinyl alcohol (PVA), triacetylcellulose (TAC), polyimide (PI), polyvinyl cinnamate (PVC) or polyolefins, for instance polynorbornene, and may, for example, be (broadband) polarizers, light-guiding elements for background illumination in LCDs (known as "light guides"), films for the distribution of light (known as "BEFs", i.e. "brightness enhancement films") and films for the generation of polarized light in LCDs (known as "DBEFs", i.e. "dual brightness enhancement films"). Further substrates in this context may also be certain structural modules of LCDs, for instance glass or polymer sheets which, if appropriate, also possess a transparent conductive coating, for example of indium tin oxide (ITO).

Light guides or BEFs can, for example, be coated directly with inventive nematic (i.e. no chiral compounds C.12 are present) or chiral nematic (i.e. chiral compounds C.12 are present) mixtures and the latter can subsequently be polymerized. The coating operation may be repeated any number of times with inventive liquid-crystalline mixtures of the same or different composition in order to obtain corresponding optical components, for instance retardation films, (broadband) polarizers and optical filters. This allows production of a correspondingly more compact structure of the optical components in LCDs.

In addition, the process according to the invention can be used to apply a suitable nematic layer as a retardation film to a (broadband) polarizer which affords circular-polarized light. This allows circular-polarized light to be converted to linear-polarized light. In this case, the (broadband) polarizer may likewise have been produced from inventive mixtures, optionally using the process according to the invention.

Further substrates which are useful especially for the production of inventive thermal insulation layers or thermally insulating films and laminates are the backing films detailed in international PCT application PCT/EP2009/057533.

As materials for the backing films, explicit mention should be made here of polyethylene terephthalate, polyethylene naphthalate, polyvinyl butyral, polyvinyl chloride, flexible polyvinyl chloride, polymethyl methacrylate, poly(ethylene-co-vinyl acetate), polycarbonate, cellulose triacetate, polyether sulfone, polyester, polyamide, polyolefins and acrylic resins. Among these, polyethylene terephthalate, polyvinyl butyral, polyvinyl chloride, flexible polyvinyl chloride and polymethyl methacrylate are preferred.

The backing film is preferably biaxially oriented.

Further substrates are, however, also surfaces encountered in the construction sector, such as building walls or else window panes. In the latter case, a functional effect may also be desired in addition to a decorative effect. For instance, it is possible to produce multiple layers on the window material, the individual layers of which possess different physicochemical properties. When, for instance, addition of one enantiomer of a chiral compound C.12 and of the corresponding optical antipode is used to apply individual layers of the polymerized liquid-crystalline mixtures with opposite rotation, or addition of different concentrations of chiral compound C.12 is used to apply individual layers of the polymerized liquid-crystalline mixtures having the same sense of rotation but each with different pitch and hence different reflection properties, it is possible in a controlled manner to reflect particular wavelengths or wavelength ranges of the spectrum of light. This makes possible, for example IR- or UV-reflective window coating.

Accordingly, the present invention further provides for the use of inventive liquid-crystalline mixtures which comprise as component C at least one chiral dopant (component C.12) for production of thermal insulation layers, comprising one or more cholesteric layers which reflect at least 40%, especially at least 45%, of the incident radiation in the wavelength range, preferably in the wavelength range from 750 nm to 2000 nm.

The present invention further provides for the use of inventive liquid-crystalline mixtures which comprise as component C at least one chiral dopant (component C.12) for production of thermal insulation layers, comprising one or more cholesteric layers which have a transmission of at least 80%, especially at least 90%, of the incident radiation in the wavelength range from 390 nm to 750 nm.

More particularly claimed within the scope of the present invention are thermal insulation layers which comprise one or more cholesteric layers which reflect at least 40%, especially at least 45%, of the incident radiation in the infrared wavelength range, preferably in the wavelength range from 750 nm to 2000 nm, which are obtainable using inventive liquid-crystalline mixtures comprising as component C at least one chiral dopant (component C.12).

Additionally claimed within the scope of the present invention are also thermal insulation layers which comprise one or more cholesteric layers which have a transmission of at least 80%, especially at least 90%, of the incident radiation in the wavelength range from 390 nm to 750 nm, which are obtainable using inventive liquid-crystalline mixtures comprising as component C at least one chiral dopant (component C.12).

The inventive thermal insulation layers in this context may be self-supporting layers or films which consist essentially only of inventive chiral nematic (i.e. chiral compounds C.12 are present) polymerized mixtures, or else laminates which comprise the backing film(s) already mentioned above as an integral constituent.

The backing film may additionally be coated on one or both sides with the inventive chiral nematic (i.e. chiral compounds C.12 are present) and polymerized mixtures.

In the case of single-sided coating, the backing film may remain in the thermal insulation layer and hence become an integral constituent thereof, or the backing film merely assumes the function of a backing during the production of the thermal insulation layer and is subsequently removed to leave a self-supporting thermally insulating film or a self-supporting thermally insulating layer.

In the case of double-sided coating, the backing film of course remains in the thermal insulation layer and becomes an integral constituent thereof.

With regard to this aspect of the inventive liquid-crystalline mixtures, especially in relation to thermal insulation layers, reference is made not only to the prior PCT application PCT/EP2009/057533 but also mutatis mutandis to the document WO 99/19267 A1.

The present invention further provides for the use of the inventive liquid-crystalline mixtures or of the inventive oligomers or polymers for production of optical or electrooptical components. Examples thereof include LCDs and components thereof, for example (broadband) polarizers, optical filters, retardation films and BEFs.

With regard to the production of such components based on polymerizable liquid-crystalline materials, reference is made mutatis mutandis, for instance, to the document WO 00/37585 A1.

With regard to the use of inventive chiral nematic mixtures for production of (broadband) polarizers, reference is made mutatis mutandis, for example, to the documents U.S. Pat. No. 6,421,107, U.S. Pat. No. 6,417,902, U.S. Pat. No. 6,061, 108, U.S. Pat. No. 6,099,758, U.S. Pat. No. 6,016,177, U.S. Pat. No. 5,948,831, U.S. Pat. No. 5,793,456, U.S. Pat. No. 5,691,789 and U.S. Pat. No. 5,506,704.

With regard to the use of inventive liquid-crystalline mixtures for production of DBEFs, reference is made mutatis mutandis, for example, to the documents U.S. Pat. No. 4,525, 413, U.S. Pat. No. 5,828,488 and U.S. Pat. No. 5,965,247.

The latter two documents describe laminates of polymer layers whose optical properties are such that one layer $S^1$ exhibits either isotropic or anisotropic optical behavior, but the adjacent layer $S^2$ exhibits anisotropic optical behavior differing from $S^1$. The value of the refractive index $n_1^{\,1}$ in one planar direction of $S^1$ corresponds substantially to the refractive index $n_1^{\,2}$ in the same planar direction of $S^2$, but the refractive indices $n_2^{\,1}$ and $n_2^{\,2}$ for $S^1$ and $S^2$ in the respective planar direction at right angles thereto differ. Light rays incident on these laminates are therefore, depending on their direction of polarization, either transmitted (when $n_1^{\,1}$ and $n_1^{\,2}$ are substantially equal) or reflected (when $n_2^{\,1}$ and $n_2^{\,2}$ are different from one another). The anisotropic layers $S^2$ may therefore, in alternation with polymer layers with suitable isotropic or anisotropic refractive index, consist of corresponding polymers or oligomers obtained by polymerization of inventive nematic mixtures. Examples of useful polymer layers $S^1$ are also adhesives which bond the anisotropic layers $S^2$ to one another, or polymer films with suitable glass transition temperatures, which form the desired laminate together with the layers $S^2$ in the case of suitable thermal treatment. In addition, a polymer layer $S^1$ can be coated with an inventive nematic mixture, a further polymer layer $S^1$ can be applied and then the mixture between the two polymer layers $S^1$ can be polymerized. Irrespective of the procedure selected for production of such laminates, sufficiently good adhesion of the layers $S^1$ and $S^2$ to one another of course has to be ensured.

The inventive liquid-crystalline mixtures can also be used as a disperse liquid-crystalline phase in polymer-dispersed liquid crystals (PDLCs). Such PDLCs may in principle either have an isotropic polymer matrix and both a macroscopically isotropic and an anisotropic disperse liquid-crystalline phase, or an anisotropic polymer matrix and both a macroscopically isotropic and an anisotropic disperse liquid-crystalline phase, in which case the macroscopically isotropic phase results from the random distribution of microscopically anisotropic domains.

In general, such PDLCs are produced proceeding from a (generally optically anisotropic) polymer film in which the liquid-crystalline phase is present homogeneously dispersed in the form of ultrafine inclusions, typically in the micrometer or submicrometer size range. Stretching of the polymer film imposes anisotropic optical behavior both on the polymer matrix and on the disperse phase. When inventive liquid-crystalline mixtures are used, the anisotropic state of the disperse phase can be frozen by polymerization and hence, for example, distinctly better thermal (cycling) stability can be achieved. The polymer matrix used here is usually polyvinyl alcohol.

In addition, inventive chiral nematic mixtures—they comprise at least one chiral dopant C.12—may, for example, also be used to produce optical components, as described in documents U.S. Pat. No. 5,235,443 and U.S. Pat. No. 5,050,966.

The inventive liquid-crystalline mixtures may additionally also find use as a liquid-crystalline colorant or for production of liquid-crystalline colorants. Use as colorants is possible when the mixtures per se are colored. This color may be based on interference effects of a chiral nematic phase present and/or on absorption effects of dyes and/or pigments present. In addition, the mixtures—irrespective of whether they are colored or not—may also serve for production of colorants. With regard to the production of liquid-crystalline colorants and the use thereof for printing or coating substrates, reference is made mutatis mutandis to the document WO 96/02597 A2.

The inventive liquid-crystalline mixtures may additionally find use in the production of dispersions and emulsions, which are preferably water-based. For production of such dispersions and emulsions using liquid-crystalline materials, reference is made here to WO documents 96/02597 A2 and 98/47979 A1. These dispersions and emulsions can likewise be used for printing and coating of substrates as have already been described above by way of example.

In addition, the inventive mixtures may also find use in the production of pigments. The production of such pigments is known and is described in detail, for example, in document WO 99/11733 A1. Moreover, it is also possible to produce pigments preadjusted in shape and size using printing techniques or with the aid of networks whose interstices contain the liquid-crystalline mixtures. The subsequent polymerization of the liquid-crystalline mixtures is followed here by removal or leaching from the substrate or out of the network. These procedures are described in detail in WO documents 96/02597 A1, 97/27251 A1, 97/27252 A1, and the document EP 0 931 110 A1.

These pigments may have a single layer or a multilayer structure. The latter pigments are typically producible only when coating processes are employed in which a plurality of successive layers are superposed and finally subjected to mechanical comminution.

The examples which follow are intended to illustrate the invention, but without restricting it.

Example

I. Preparation of Inventive Liquid-Crystalline Mixtures and of Comparative Mixtures On the basis of the nematic compounds

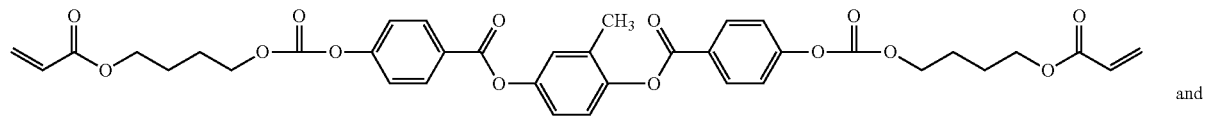

LC 1 (component B)

and

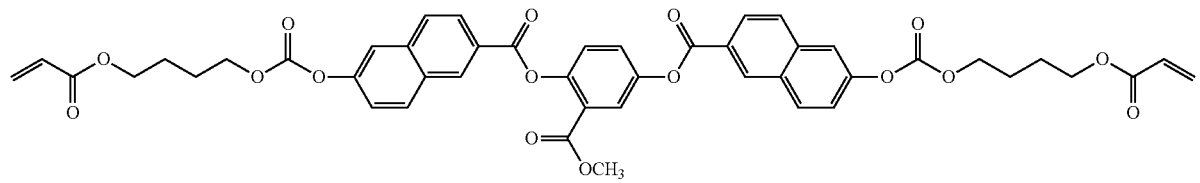

LC 2 (component A)

and the chiral dopant

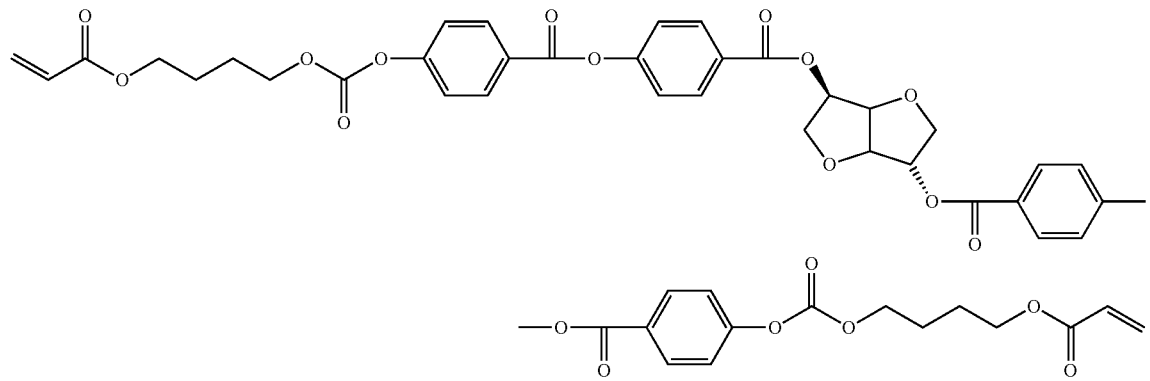

DS (component C.12)

mixtures A to E were prepared. The relative proportions of LC 1 and LC 2 in % by weight and mol % are listed in tables 1a and 1b respectively, and the absolute amounts in table 2.

TABLE 1a

| % by weight based on the total weight of LC 1 and LC 2 | Mixture A (comparative) | Mixture B (comparative) | Mixture C (inventive) | Mixture D (comparative) | Mixture E (comparative) |
| --- | --- | --- | --- | --- | --- |
| LC 1 | 0.0 | 100.0 | 75.0 | 50.0 | 25.0 |
| LC 2 | 100.0 | 0.0 | 25.0 | 50.0 | 75.0 |

TABLE 1b

| mol % based on the total weight of LC 1 and LC 2 | Mixture A (comparative) | Mixture B (comparative) | Mixture C (inventive) | Mixture D (comparative) | Mixture E (comparative) |
| --- | --- | --- | --- | --- | --- |
| LC 1 | 0.0 | 100.0 | 71.4 | 45.4 | 21.7 |
| LC 2 | 100.0 | 0.0 | 28.6 | 54.6 | 78.3 |

TABLE 2

| | Mixture A (comparative) | Mixture B (comparative) | Mixture C (inventive) | Mixture D (comparative) | Mixture E (comparative) |
| --- | --- | --- | --- | --- | --- |
| LC 1 (component A) | 0.000 g | 31.334 g | 23.500 g | 15.667 g | 7.833 g |
| LC 2 (component B) | 31.334 g | 0.000 g | 7.833 g | 15.667 g | 23.500 g |
| DS (component C.12) | 1.650 g | 1.650 g | 1.650 g | 1.650 g | 1.650 g |

TABLE 2-continued

|  | Mixture A (comparative) | Mixture B (comparative) | Mixture C (inventive) | Mixture D (comparative) | Mixture E (comparative) |
|---|---|---|---|---|---|
| Total weight of LC 1, LC 2 and DS | 32.984 g | 32.984 g | 32.984 g | 32.984 g | 32.984 g |
| Irgacure 907 (component C.1) | 1.649 g | 1.649 g | 1.649 g | 1.649 g | 1.649 g |
| Cyclopentanone (component C.3) | 67.017 g | 67.017 g | 67.017 g | 67.017 g | 67.017 g |
| Byk 361N (component C.5) | 1.649 g | 1.649 g | 1.649 g | 1.649 g | 1.649 g |

The sums of the proportions of LC 1 and LC 2 on the one hand and DS on the other hand, in all mixtures A to E, were 95% by weight and 5% by weight respectively, based on the total weight of LC 1, LC 2 and DS.

The mixtures A to E were prepared by stirring the components at 50° C. by means of a magnetic stirrer for 5 minutes and then filtering (Whatman Puradisc 25TF, 1 μm membrane filter).

Subsequently, 2-2.5 ml of each mixture were applied to the polymer substrate (PET Lumirror 4001, film thickness 50 μm, rubbed five times with velvet from Torray over the whole area for better orientation of the mixtures) and drawn down to a film with a 30 μm spiral bar coater. After evaporating off the solvent in a closed fumehood (no ventilation) at 120° C. for two minutes, polymerization was effected under UV light (UV-AB with quartz filter) for two minutes. This gave a layer thickness of approx. 4.5-5 μm.

The films obtained were assessed qualitatively under an optical microscope with a magnification of 100:1. Comparisons were made against images of films of different quality (FIGS. 1 to 6); the marks given ranged from 1 (best; FIG. 1) to 6 (worst; FIG. 6).

Table 3 lists the results for the polymer films obtained from mixtures A to E.

TABLE 3

| Mixture | Film quality (mark) | Layer thickness |
|---|---|---|
| A (comparative) | 4 | 4.7 μm |
| B (comparative) | 5 | 4.8 μm |
| C (inventive) | 1 | 4.9 μm |
| D (comparative) | 2.5 | 5.0 μm |
| E (comparative) | 4.5 | 4.9 μm |

The birefringence and width of the spectral reflection of the polymer films changed in a substantially linear manner between the values for 100% LC 1 (0% LC 2) and 100% LC 2 (0% LC 1).

II. Change in the Components of Mixtures A to E

Analogous results were obtained when the solvent was changed (component C.3), the photoinitiator was changed (component C.1) and the amount of leveling aid added was changed (component C.5).

Solvent: 80:20 cyclohexanone/ethyl acetate (instead of cyclopentanone)

Photoinitiator: Irgacure OXE01 (instead of Irgacure 907)

Amount of leveling aid (Byk 361 N): 0.825 g (instead of 1.649 g)

III. Change of Substrate and Application Method

Analogous results were obtained when the substrate and the application method for mixtures A to E were changed.

Substrate: polyimide-coated glass (instead of Lumirror 4001)

Application method: spincoating (instead of spiral coating bar)

It should be mentioned that of course not every substrate is suitable. To the extent that, however, orientation of the inventive liquid-crystalline mixtures on the substrate can be achieved or the latter is wetted by the inventive liquid-crystalline mixtures, a distinct improvement in orientation and in the quality of the films obtained is observed.

The invention claimed is:

1. A liquid-crystalline mixture, comprising:

(A) at least one compound of the formula I:

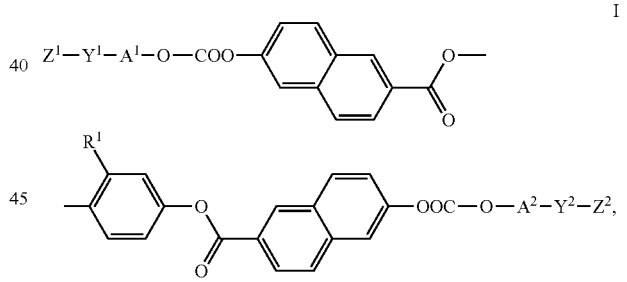

(B) at least one compound of the formula II:

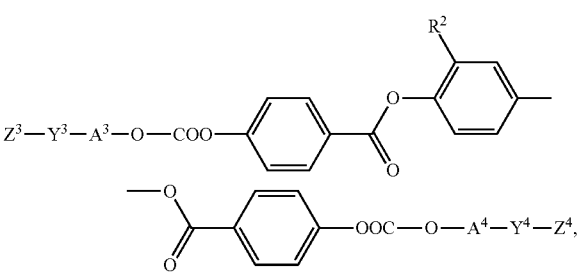

(C) at least one compound selected from the group consisting of a photoinitiator, a reactive diluent comprising a photopolymerizable group, a diluent, a defoamer, a deaerator, a lubricant, a leveling agent, a thermally curing auxiliary, a radiatively curing auxiliary, a substrate wetting aids, a wetting aid, a dispersing aid, a hydrophobizing agent, an adhesion promoter, a scratch resistance auxiliary, and a chiral dopant, and (D) optionally, at least one substance selected from the group consisting of a dye and a pigment, wherein $Z^1$, $Z^2$, $Z^3$, and $Z^4$ are each independently

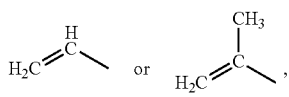

$A^1$, $A^2$, $A^3$, and $A^4$ are each independently a spacer having 4 to 8 carbon atoms, $Y^1$, $Y^2$, $Y^3$, and $Y^4$ are each independently a single chemical bond, oxygen, —CO—, —O—CO—, or —CO—O—, $R^1$ and $R^2$ are each independently hydrogen, $C_1$-$C_6$-alkyl, or CO—O—$C_1$-$C_6$-alkyl, wherein a proportion of component A is from 22.5 mol % to 32.5 mol % and a proportion of component B is from 67.5 mol % to 77.5 mol %, based on the total molar amount of A and B, wherein the total of the components A and B is 100 mol %.

2. The liquid-crystalline mixture of claim 1, wherein $Z^1$—$Y^1$, $Y^2$—$Z^2$, $Z^3$—$Y^3$, and $Y^4$—$Z^4$ are each independently:

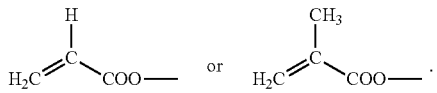

3. An oligomer or polymer, obtained by a process comprising:
oligomerizing or polymerizing the mixture of claim 1.

4. A process for printing or coating a substrate, the process comprising:
applying the mixture of claim 1 to the substrate, and then polymerizing the mixture.

5. A process for producing an optical or electrooptical component, comprising:
producing an optical or electrooptical component with the mixture of claim 1.

6. A process for producing a thermal insulation layer, the process comprising:
producing the layer with the mixture of claim 1,
wherein the layer comprises a cholesteric layer capable of reflecting at least 40%-of infrared incident radiation, and the component (C) comprises a chiral dopant.

7. A process for producing a thermal insulation layer, the process comprising:
producing the layer with the mixture of claim 1,
wherein the layer comprises a cholesteric layer with a transmission of at least 80% of incident radiation of a wavelength from 390 nm to 750 nm.

8. A thermal insulation layer, comprising:
a cholesteric layer, capable of reflecting at least 40% of infrared incident radiation, wherein the cholesteric layer is obtained by a process comprising producing the cholesteric layer with the mixture of claim 1, and
component the (C) comprises a chiral dopant.

9. A thermal insulation layer, comprising:
a cholesteric layer with a transmission of at least 80% of incident radiation of wavelength of from 390 nm to 750 nm,
wherein the cholesteric layer is obtained by a process comprising producing the layer with the mixture of claim 1, and
wherein component the (C) comprises a chiral dopant.

10. The process of claim 6, wherein the cholesteric layer is capable of reflecting at least 45% of infrared incident radiation.

11. The process of claim 6, wherein the cholesteric layer is capable of reflecting at least 40% of incident radiation with a wavelength of from 750 to 2000 nm.

12. The process of claim 6, wherein the cholesteric layer is capable of reflecting at least 45% of incident radiation with a wavelength of from 750 to 2000 nm.

13. The process of claim 7, wherein the cholesteric layer has a transmission of at least 90% of incident radiation with a wavelength of from 390 nm to 750 nm.

14. The thermal insulation layer of claim 8, wherein the cholesteric layer is capable of reflecting at least 45% of infrared incident radiation.

15. The thermal insulation layer of claim 8, wherein the cholesteric layer is capable of reflecting at least 40% of incident radiation with a wavelength of from 750 to 2000 nm.

16. The thermal insulation layer of claim 8, wherein the cholesteric layer is capable of reflecting at least 45% of incident radiation with a wavelength of from 750 to 2000 nm.

17. The thermal insulation layer of claim 9, wherein the cholesteric layer has a transmission of at least 90% of incident radiation with a wavelength of from 390 nm to 750 nm.

* * * * *